(12) United States Patent
Kowollik

(10) Patent No.: US 11,787,343 B2
(45) Date of Patent: Oct. 17, 2023

(54) CARGO SPACE DEVICE FOR A FRONT PART OF A MOTOR VEHICLE

(71) Applicant: Daimler AG, Stuttgart (DE)

(72) Inventor: Volker Kowollik, Fellbach (DE)

(73) Assignee: Daimler AG, Stuttgart (DE)

( * ) Notice: Subject to any disclaimer, the term of this patent is extended or adjusted under 35 U.S.C. 154(b) by 36 days.

(21) Appl. No.: 17/616,566

(22) PCT Filed: May 6, 2020

(86) PCT No.: PCT/EP2020/062490
§ 371 (c)(1),
(2) Date: Dec. 3, 2021

(87) PCT Pub. No.: WO2020/244870
PCT Pub. Date: Dec. 10, 2020

(65) Prior Publication Data
US 2022/0234507 A1    Jul. 28, 2022

(30) Foreign Application Priority Data
Jun. 6, 2019  (DE) ..................... 10 2019 004 010.4

(51) Int. Cl.
*B60R 5/02*   (2006.01)
*B60R 7/02*   (2006.01)

(52) U.S. Cl.
CPC . *B60R 5/02* (2013.01); *B60R 7/02* (2013.01)

(58) Field of Classification Search
CPC .... B60R 5/02; B60R 5/04; B60R 7/02; B62D 25/105; B62D 25/12
(Continued)

(56) References Cited

U.S. PATENT DOCUMENTS 5,301,992 A * 4/1994 Whitmore ................ B60R 5/04
                                                       296/26.1
6,145,447 A * 11/2000 Henderson ................ B60R 5/04
                                                       108/115
(Continued)

FOREIGN PATENT DOCUMENTS

DE          196 20 294 A1   11/1997
DE    10 2017 004 263 A1    12/2017
(Continued)

OTHER PUBLICATIONS

English translation of DE 10 2017 011 984; retrieved via Patent-Translate located atwww.epo.org. (Year: 2023).*

(Continued)

*Primary Examiner* — Jason S Daniels
(74) *Attorney, Agent, or Firm* — Crowell & Moring LLP

(57) ABSTRACT

A cargo space device for a front part having a front space of a motor vehicle, where the front space is coverable by a moveable front bonnet. The cargo space device includes a cargo space and a shifting device where the cargo space is shiftable by the shifting device between a stowed position accommodated in the front part and an extended position that is raised in relation to the stowed position in a first shifting direction. The cargo space is pivotable around a pivoting axis running in a region of a lower front marginal edge of the cargo space, in relation to the shifting device, in a second shifting direction which is different from the first shifting direction.

8 Claims, 2 Drawing Sheets

(58) Field of Classification Search
USPC .............................................. 296/24.45, 37.1
See application file for complete search history.

(56) References Cited

U.S. PATENT DOCUMENTS

| | | | | |
|---|---|---|---|---|
| 11,208,046 | B2* | 12/2021 | Liu | ...................... B62D 25/087 |
| 2007/0189885 | A1* | 8/2007 | Madormo | ................. B60R 5/04 |
| | | | | 414/467 |
| 2021/0371015 | A1* | 12/2021 | Okamura | ............... B62D 25/12 |

FOREIGN PATENT DOCUMENTS

| | | | |
|---|---|---|---|
| DE | 10 2017 010 161 A1 | 7/2018 | |
| DE | 10 2017 011 984 A1 | 6/2019 | |
| DE | 10 2018 208 799 A1 | 12/2019 | |
| DE | 102019000158 A1 * | 7/2020 | ............... B60R 5/02 |

OTHER PUBLICATIONS

PCT/EP2020/062490, International Search Report dated Jul. 2, 2020 (Two (2) pages).
German-language German Office Action issued in German application No. 10 2019 004 010.4 dated Jun. 8, 2021 (Six (6) pages).

* cited by examiner

CARGO SPACE DEVICE FOR A FRONT PART OF A MOTOR VEHICLE

BACKGROUND AND SUMMARY OF THE INVENTION

The invention relates to a cargo space device for a front part of a motor vehicle.

In the case of electrically driven cars, the lack of internal combustion engine leads to a gain in space in the region of the front part of the motor vehicle, which can be used for accommodating a cargo space. However, such cargo spaces in the region of a front space of the front part, the front space being able to be sealed by a front bonnet, have the disadvantage that they often extend very deeply into the front space of the front part in the vertical direction of the vehicle and, accordingly, are relatively uncomfortable for loading and unloading.

A shiftable cargo space emerges from DE 10 2017 004 263 A1, which is formed as a kind of tub or box and can be shifted by means of a shifting device between a stowed position accommodated in the front part and a position at least partially extended out of the front part in a corresponding shifting direction—usually in parallel to the vertical direction of the vehicle.

The object of the present invention is to create a cargo space device of the kind mentioned at the start by means of which an installation space in the region of the front part of the motor vehicle can be used particularly well for accommodating the cargo space and which, on the other hand, is accessible particularly ergonomically and comfortably for loading and unloading.

The cargo space device according to the invention is provided in the region of the front space in the front part of the motor vehicle, wherein this front space can be covered at least partially upwardly or from above by means of a front bonnet that can be shifted, in particular pivoted, between an open position and a closed position. The cargo space device is characterised in that a cargo space that is, for example, box-shaped or tub-shaped can be shifted in a shifting direction by means of a shifting device between a stowed position accommodated in the front part and a position that is raised in comparison to this and is, in particular, extended at least partially out of a front part. The shifting device is here supported in the region of the front space, in particular, and preferably does not have any mechanical coupling or similar connection to the front bonnet, by means of which the shifting movement of the cargo space would be mechanically coupled to that of the front bonnet.

The shifting direction of the cargo space can run linearly or even in an arcuate manner at least in some longitudinal regions. The shifting device can here only achieve a corresponding mounting or guide, or correspondingly support a manual shifting, for example, by means of spring elements such as gas compression springs or similar. In a particularly comfortable embodiment, it would also be conceivable for the shifting device to comprise an automatic or motorised drive by means of which the cargo space can be shifted between the respective positions. The shifting in the corresponding shifting direction between the position accommodated in the front part and the at least partially extended position here enables as great a use of the free installation space inside the front space of the front part as possible, as a result of choosing a suitable shifting path.

In order to now be able to load and unload the cargo space in a particularly ergonomic and comfortable manner, it can be shifted, according to the invention, around a pivoting axis running in the region of its lower front marginal edge in relation to the shifting device in a further shifting direction different to the first shifting direction. Thus, it is conceivable, for example, that the cargo space is firstly shifted in the first shifting direction out of the stowed position accommodated in the front part into the position extended at least partially out of the front part along a corresponding shifting track, and in particular, upon reaching this extended position, but optionally also in a superimposed movement, the cargo space can be shifted in a second shifting direction different to the first shifting direction into a loading and unloading position, in which the cargo space can be accessed particularly comfortably and ergonomically. Thus, the first shifting direction can be, for example, an extensively linear or arcuate shifting track, whereas the different second shifting direction can be a pivoting alignment around a corresponding pivoting axis. Such a pivoting alignment around a corresponding pivoting axis enables a tilting or slanting of the cargo space towards a person standing in front of the vehicle, such that the cargo space is accessible particularly well and comfortably.

A further advantageous embodiment of the invention provides that the pivoting of the cargo space in the further shifting direction takes place only upon reaching the extended position. This results in extremely simple and reproducible shifting in terms of the movement courses between the stowed position and the loading and unloading position. It is, however, clear that the cargo space can also optionally be loaded and unloaded in the stowed position or in the position partially extended out of the front part, though this would be correspondingly less comfortable.

A further advantageous embodiment of the invention provides that the cargo space can be sealed or is sealed by a cover which can be pivoted around a pivoting axis running in the region of its upper rear marginal edge. In doing so, the cover can be opened upwardly from below in a simple manner and stopped, for example, in order to achieve particularly favourable ergonomic handling.

Alternatively to this, the cargo space can also be sealed by a cover which can be pivoted around a pivoting axis running in the region of its upper front marginal edge. Thus, the cover can be opened towards the front and downwards, which is particularly favourably possible without great physical exertion.

In this context, it has been shown to be further advantageous if the cover is also formed as a cargo edge protection element by means of which components arranged in a loading and unloading region of the cargo space, for example bumper cladding, a soft nose or a crossmember, can be covered in the region of a front bonnet lock or similar. The cover thus assumes a double function, namely on one hand covering the cargo space and, on the other hand, protecting the components in the vicinity of the cargo space.

In a further advantageous embodiment of the invention, it is provided that the cargo space can be shifted by means of the shifting device manually, supported by force and/or powered between the stowed position and the extended position and, optionally, out of this for the loading and unloading position as well. In other words, in a simple embodiment, the shifting device serves only as a guide for the cargo space, in a favourable embodiment as an additional force support, for example by means of gas compression springs or similar, in order to simplify the manual shifting, and in a particularly comfortable embodiment as motorised support in order to optionally completely automatically enact the shifting of the cargo space. Of course, only the respective movement directions can also be carried out in the described manner.

Furthermore, it has been shown to be advantageous if the shifting device can be stopped in the stowed position and/or in the extended position. In doing so, a particularly stable and reliable respective positioning of the cargo space emerges.

Finally, it has been shown to be advantageous if the shifting device comprises a support console or similar, on which the cargo space is mounted to shift the further shifting device. This has the advantage, in particular, that a particularly stable and reliable positioning and mounting of the cargo space can be achieved. Here, the cargo space can optionally also be formed releasably from the support console in order to be able to particularly favourably clean the cargo space, for example.

Further advantages, features and details of the invention emerge from the description below of a preferred exemplary embodiment and by means of the drawings. The features and feature combinations mentioned in the description below and the features and feature combinations mentioned below in the description of the figures and/or shown in the figures alone can be used not only in the respectively specified combination, but also in other combinations or on their own without leaving the scope of the invention.

DETAILED DESCRIPTION OF THE DRAWINGS

Figure 1:
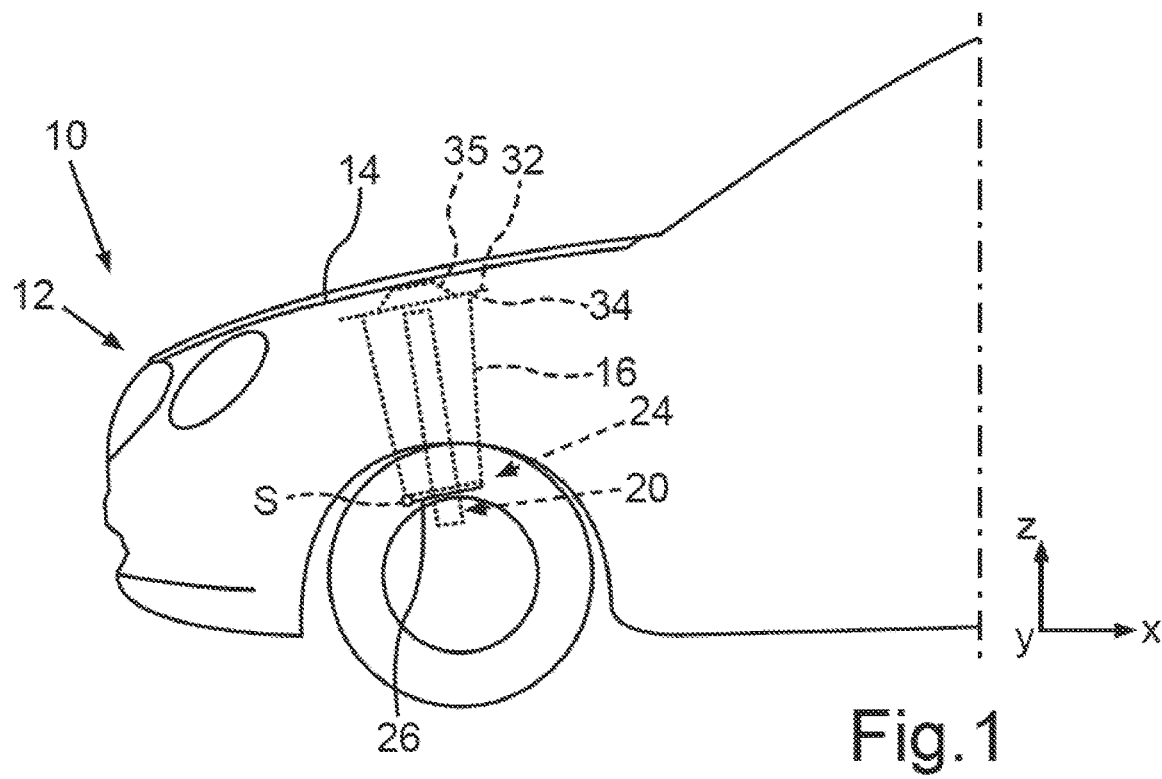
FIG. 1 is a cut-out and schematic side view of a front part of a passenger vehicle, which delimits a front space that can be sealed by a front bonnet and inside which a cargo space in a stowed position accommodated in the front part is indicated.
Figure 2:
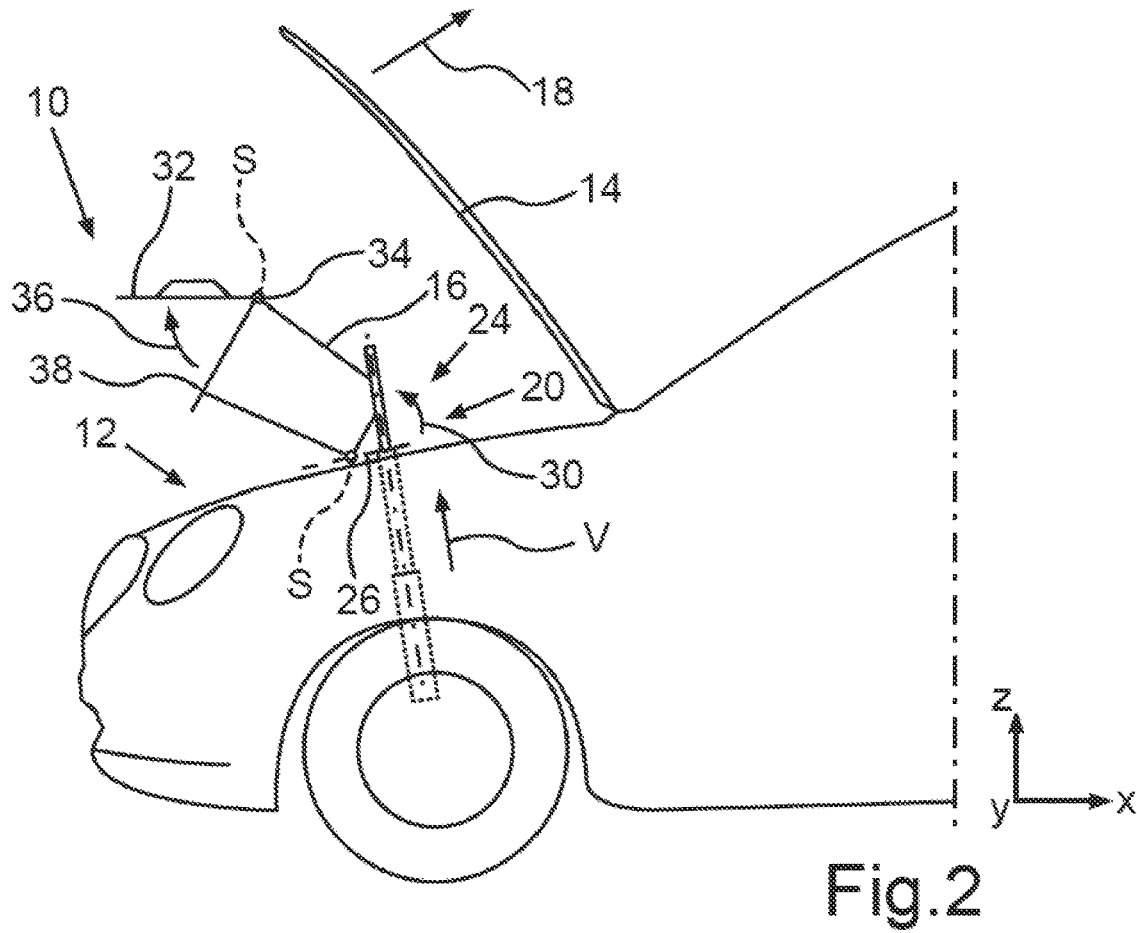
FIG. 2 is a cut-out and schematic side view of the front part according to FIG. 1, in which the front bonnet is depicted opened and the cargo space is shifted by means of a shifting device out of the stowed position depicted in FIG. 1 into a position extended out of the front space of the front part in a linear shifting direction and has then been pivoted around a pivoting axis in relation to the first shifting device in a further shifting direction, wherein a cover for sealing the cargo space has then been opened.

In FIGS. 1 and 2, a front part 10 of a motor vehicle, in particular a passenger motor vehicle, is depicted in each case in a cut-out and schematic side view. Presently, the passenger motor vehicle is, in particular, a purely electrically operated vehicle (BEV), yet optionally also a hybrid vehicle (PHEV) which, due to a correspondingly large internal combustion engine not being present, has a free installation space for a cargo space device still be described in more detail. In the present case, this cargo space device is arranged inside a front space 12 delimited by a front part 10, which is upwardly covered by a front bonnet 14 depicted closed in FIG. 1 and open in FIG. 2.

The cargo space device comprises a tub- or box-shaped cargo space 16 which, in FIG. 1, is arranged below the closed front bonnet 14 in a stowed position accommodated in the front part 10.

After opening the front bonnet 14 pivotably mounted in a region close to the windscreen in a direction indicated with an arrow 18, the cargo space 16 can be raised by means of a shifting device 20 out of the stowed position depicted in FIG. 1 into a position shifted upwardly in relation to this. In the exemplary embodiment, depicted in the figures, of the cargo space device, it is provided that the cargo space 16 in its raised position is extended at least partially out of the front part 10 or the front space 12, as indicated in FIG. 2.

Figure 3:
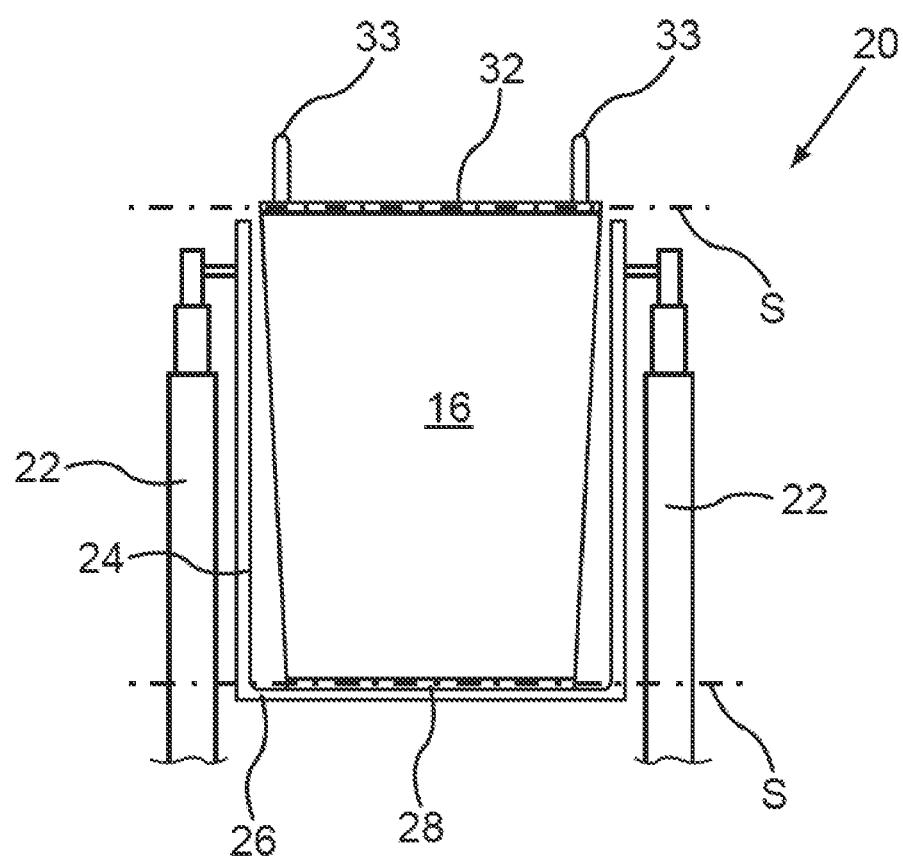
FIG. 3 is a schematic front view of the cargo space held on the shifting device according to FIGS. 1 and 2.

For this, as can be seen in FIG. 3 in a cut-out and schematic front view, the shifting device 20 has respective lateral telescopic rods 22 or other suitable mounting and/or guiding means, by means of which the cargo space 16 can be shifted upwardly or downwardly in a shifting direction indicated with an arrow V. In the present case, the shifting direction V corresponds to a straight line, which runs diagonally in the driving direction to the front in relation to the vertical direction of the vehicle (z-direction). Because of this alignment of the telescopic rods, the cargo space also simultaneously shifts in the direction of a person standing in front of the vehicle when raising, such that they do not have to carry the objects to be introduced into the cargo space so far in opposition to the forwards driving direction of the motor vehicle, i.e., in the longitudinal direction of the vehicle (x-direction), in order to introduce them into the cargo space. It would also be conceivable for the shifting direction to run in parallel or substantially in parallel to the z-direction. It would also be conceivable for the shifting direction V to run in an arc-like manner in longitudinal regions.

As can further be seen in FIG. 3, a support console 24 is arranged centrally between the two lateral telescopic rods 22, which is formed overall to be U-shaped, for example, and is connected with its respective upper ends to those of the respectively laterally allocated telescopic rod 22. In doing so, the support console 24 has a support plate 26 on which, in the present case, the cargo space 16 is arranged. On a front lower edge region 28, the box-shaped cargo space 16 is flexibly connected to the support plate 26 in the region of a pivoting axis S, which presently runs in the transverse direction of the vehicle (y-direction) and at least substantially horizontally. In doing so, the cargo space 16 can be shifted around the pivoting axis S in relation to the support plate 26 or to the support console 24 of the shifting device 20 in a second shifting direction different to the first shifting direction V and indicated with an arrow 30.

In the present exemplary embodiment, the cargo space 16 can be sealed or is sealed by a cover 32 which can be pivoted around a pivoting axis s running in the region from its upper rear marginal edge 32. Accordingly, in the present case, the cover 32 can be opened upwardly from the diagonal cargo space 16 according to an arrow 36. Alternatively to this, it is also conceivable to pivotably arrange the cover 32 around a pivoting axis of the cargo space 16 running in the region of the upper front marginal edge 38. In this case, the cover 32 can also be formed as a cargo edge protection element by means of which components of the front part 10 arranged in a loading and unloading region arranged, in particular, in front of the front part 10, for example parts of the bumper cladding and/or crossmember covering bar on the motor vehicle bodywork side.

In the present exemplary embodiment, the cargo space 16 can be shifted manually between both the stowed position shown in FIG. 1 and the extended position, in which the cargo space 16 is initially still in contact with the support plate 26. To do so, there are handles 33 on the cover 32, which is stopped on the cargo space 16 in its closed position and can be opened for loading and unloading by releasing the stop.

Similarly, a force-supported solution would be conceivable in which gas compression springs or similar elements, for example, are used in order to facilitate manual raising, in particular. Vice versa, manual lowering can accordingly also be facilitated and attenuated. In the present case, the cargo space 16 can then be pivoted forwards around the pivoting axis s out of the extended position or the rest position on the support plate 22 according to the arrow 30, after which the cover 32 can in turn be opened according to arrow 36. The pivoting movement of the cargo space in the further movement direction according to arrow 30 can also optionally be supported by force or be carried out automatically by a drive. This also applies to opening and closing the cover 32.

In the present case, the shifting device 20 can moreover be stopped in the stowed position and/or in the extended position in order to achieve particularly favourable fixtures and cargo positions in each case.

Furthermore, it can be seen, in particular, that the shifting of the cargo space between the stowed position and the extended position according to the shifting direction V as well as the further pivoting according to arrow 30 and opening and closing the cover 32 according to arrow 36 is carried out independently of a movement or position of the front bonnet 14. This makes it possible, in particular, to control the respective position of the cargo space 16 in a space-saving and individual manner.

The second shifting movement of the cargo space 16 and the pivoting axis s in the second shifting direction 30—and back—can be carried out, in particular, if the shifting device 20 is in its fixed upper position when the cargo space 16 is extended. In certain circumstances, a superimposed movement of the cargo space 16 in the first shifting direction according to arrow V and in the second shifting direction according to arrow 30 would also be conceivable.

The invention claimed is:

1. A cargo space device for a front part (10) having a front space (12) of a motor vehicle, wherein the front space (12) is coverable by a moveable front bonnet (14), comprising:
    a cargo space (16); and
    a shifting device (20), wherein the cargo space (16) is shiftable by the shifting device (20) between a stowed position accommodated in the front part (10) and an extended position that is raised in relation to the stowed position in a first shifting direction (V), wherein the front bonnet (14) and the cargo space (16) are movable independently of each other;
    wherein the cargo space (16) is pivotable around a pivoting axis (S) running in a region of a lower front marginal edge of the cargo space (16), in relation to the shifting device (20), in a second shifting direction (30) which is different from the first shifting direction (V);
    wherein shifting device (20) comprises a support console (24) on which the cargo space (16) is mounted for shifting in the second shifting direction (30).

2. The cargo space device according to claim 1, wherein the extended position is raised in relation to the stowed position such that the cargo space (16) extends at least partially out of the front part (10).

3. The cargo space device according to claim 1, wherein the cargo space (16) is sealable by a cover (32) which is pivotable around a pivoting axis (s) running in a region of an upper rear marginal edge (34) of the cargo space (16).

4. The cargo space device according to claim 1, wherein the cargo space (16) is sealable by a cover (32) which is pivotable around a pivoting axis (s) running in a region of an upper front marginal edge (38) of the cargo space (16).

5. The cargo space device according to claim 1, wherein the cargo space (16) is shiftable manually or in a force-supported manner by the shifting device (20) between the stowed position and the extended position.

6. The cargo space device according to claim 1, wherein the shifting device (20) is stoppable in the stowed position and in the extended position.

7. A cargo space device for a front part (10) having a front space (12) of a motor vehicle, wherein the front space (12) is coverable by a moveable front bonnet (14), comprising:
    a cargo space (16); and
    a shifting device (20), wherein the cargo space (16) is shiftable by the shifting device (20) between a stowed position accommodated in the front part (10) and an extended position that is raised in relation to the stowed position in a first shifting direction (V), wherein the front bonnet (14) and the cargo space (16) are movable independently of each other;
    wherein the cargo space (16) is pivotable around a pivoting axis (S) running in a region of a lower front marginal edge of the cargo space (16), in relation to the shifting device (20), in a second shifting direction (30) which is different from the first shifting direction (V);
    wherein the cargo space (16) is shiftable in the second shifting direction (30) only after reaching the extended position.

8. A cargo space device for a front part (10) having a front space (12) of a motor vehicle, wherein the front space (12) is coverable by a moveable front bonnet (14), comprising:
    a cargo space (16); and
    a shifting device (20), wherein the cargo space (16) is shiftable by the shifting device (20) between a stowed position accommodated in the front part (10) and an extended position that is raised in relation to the stowed position in a first shifting direction (V), wherein the front bonnet (14) and the cargo space (16) are movable independently of each other;
    wherein the cargo space (16) is pivotable around a pivoting axis (S) running in a region of a lower front marginal edge of the cargo space (16), in relation to the shifting device (20), in a second shifting direction (30) which is different from the first shifting direction (V);
    wherein the cargo space (16) is sealable by a cover (32) and wherein the cover (32) is formed as a cargo edge protection element via which a component of the front part (10) disposed in a loading and unloading region of the cargo space (16) is coverable.

\* \* \* \* \*